United States Patent
Fink et al.

(10) Patent No.: US 12,039,734 B2
(45) Date of Patent: Jul. 16, 2024

(54) OBJECT RECOGNITION ENHANCEMENT USING DEPTH DATA

(71) Applicant: STREEM, INC., Portland, OR (US)

(72) Inventors: Ryan R. Fink, Vancouver, WA (US); Sean M. Adkinson, North Plains, OR (US)

(73) Assignee: STREEM, LLC., Portland, OR (US)

( * ) Notice: Subject to any disclaimer, the term of this patent is extended or adjusted under 35 U.S.C. 154(b) by 0 days.

(21) Appl. No.: 16/547,395

(22) Filed: Aug. 21, 2019

(65) Prior Publication Data

US 2020/0065557 A1 Feb. 27, 2020

Related U.S. Application Data

(60) Provisional application No. 62/720,746, filed on Aug. 21, 2018.

(51) Int. Cl.
| | |
|---|---|
| *G06T 7/13* | (2017.01) |
| *G06T 7/55* | (2017.01) |
| *G06V 10/80* | (2022.01) |
| *G06V 20/64* | (2022.01) |

(52) U.S. Cl.
CPC ............ *G06T 7/13* (2017.01); *G06T 7/55* (2017.01); *G06V 10/803* (2022.01); *G06V 20/64* (2022.01); *G06T 2207/10016* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 8,184,196 B2 * | 5/2012 | Forutanpour | G06T 7/564 348/625 |
| 10,452,947 B1 * | 10/2019 | Ahmed | G06V 10/147 |
| 2014/0071234 A1 * | 3/2014 | Millett | H04N 13/25 348/43 |
| 2015/0009214 A1 * | 1/2015 | Lee | G06T 17/10 345/420 |
| 2015/0146027 A1 * | 5/2015 | Ramachandran | H04N 5/23219 348/211.3 |
| 2018/0114349 A1 * | 4/2018 | Liu | G09G 5/14 |
| 2018/0150727 A1 * | 5/2018 | Farooqi | G06K 9/6267 |
| 2019/0108677 A1 * | 4/2019 | Blondel | G06V 20/647 |
| 2019/0378287 A1 * | 12/2019 | Hollander | G06V 20/52 |
| 2020/0368616 A1 * | 11/2020 | Delamont | A63F 13/213 |

* cited by examiner

*Primary Examiner* — Nancy Bitar
(74) *Attorney, Agent, or Firm* — Schwabe Williamson & Wyatt

(57) ABSTRACT

Methods for improving object recognition using depth data are disclosed. An image is captured of a 3-D scene along with depth data, such as in the form of a point cloud. The depth data is correlated with the image of the captured scene, such as by determining the frame of reference of each of the image and the depth data, thereby allowing the depth data to be mapped to the correct corresponding pixels of the image. Object recognition on the image is then improved by employing the correlated depth data. The depth data may be captured contemporaneously with the image of the 3-D scene, such as by using photogrammetry, or at a different time.

13 Claims, 6 Drawing Sheets

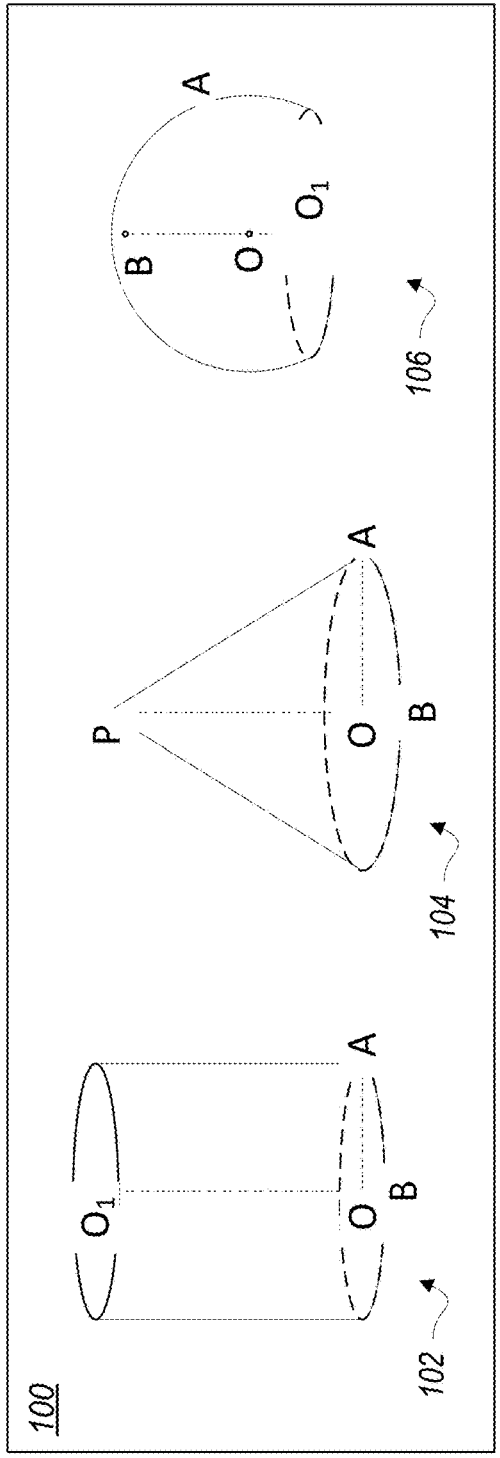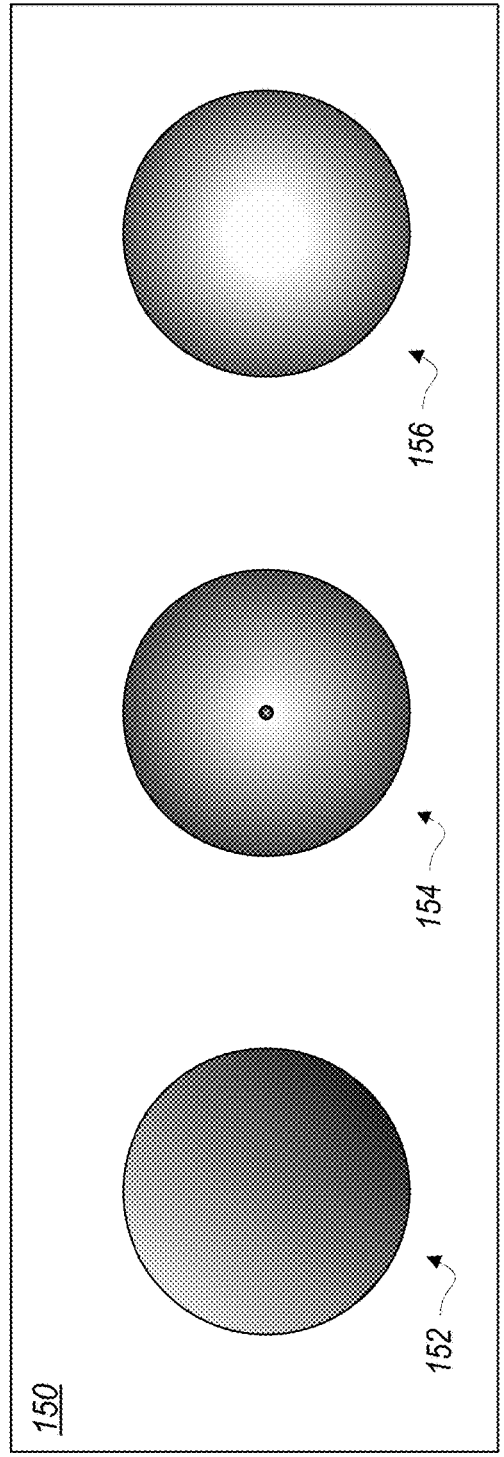
FIG. 1A
FIG. 1B

OBJECT RECOGNITION ENHANCEMENT USING DEPTH DATA

CROSS-REFERENCE TO RELATED APPLICATIONS

This application claims the benefit of U.S. Provisional Application No. 62/720,746, filed on Aug. 21, 2018, the entire contents of which is hereby incorporated by reference herein.

TECHNICAL FIELD

The present disclosure relates to the field of image processing, and more particularly to improving object recognition algorithms by incorporating depth data.

BACKGROUND

Devices such as smartphones and tablets are increasingly capable of capturing not only images and/or video, but also depth information about objects within the images and/or video. Devices may vary in how they determine and measure such depth data. For example, some devices may use infrared, laser scanning, or another suitable depth finding process, while others may use photogrammetric techniques, determining depths based upon comparing two images or subsequent frames (where a video) of the same object, but at slightly different angles. Depth information may be measured at multiple points in a given scene and/or for a given object. The measurements can be used to construct a "point cloud", comprising a series of data points with each point corresponding to depth data for an associated location in the 3-D space captured in the image(s) or video. Such depth data capture and point cloud generation may be facilitated by various augmented reality (AR) software stacks in smartphones and tablets, which can use point clouds to help place AR objects within an image or video, and scale and rotate the placed AR objects relative to subjects within the image or video as the camera may move.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 1A is a side elevation view of an example scene comprised of three geometric objects.

FIG. 1B is an overhead view looking down upon the three geometric objects depicted in FIG. 1A.

DETAILED DESCRIPTION OF DISCLOSED EMBODIMENTS

Figure 1C:
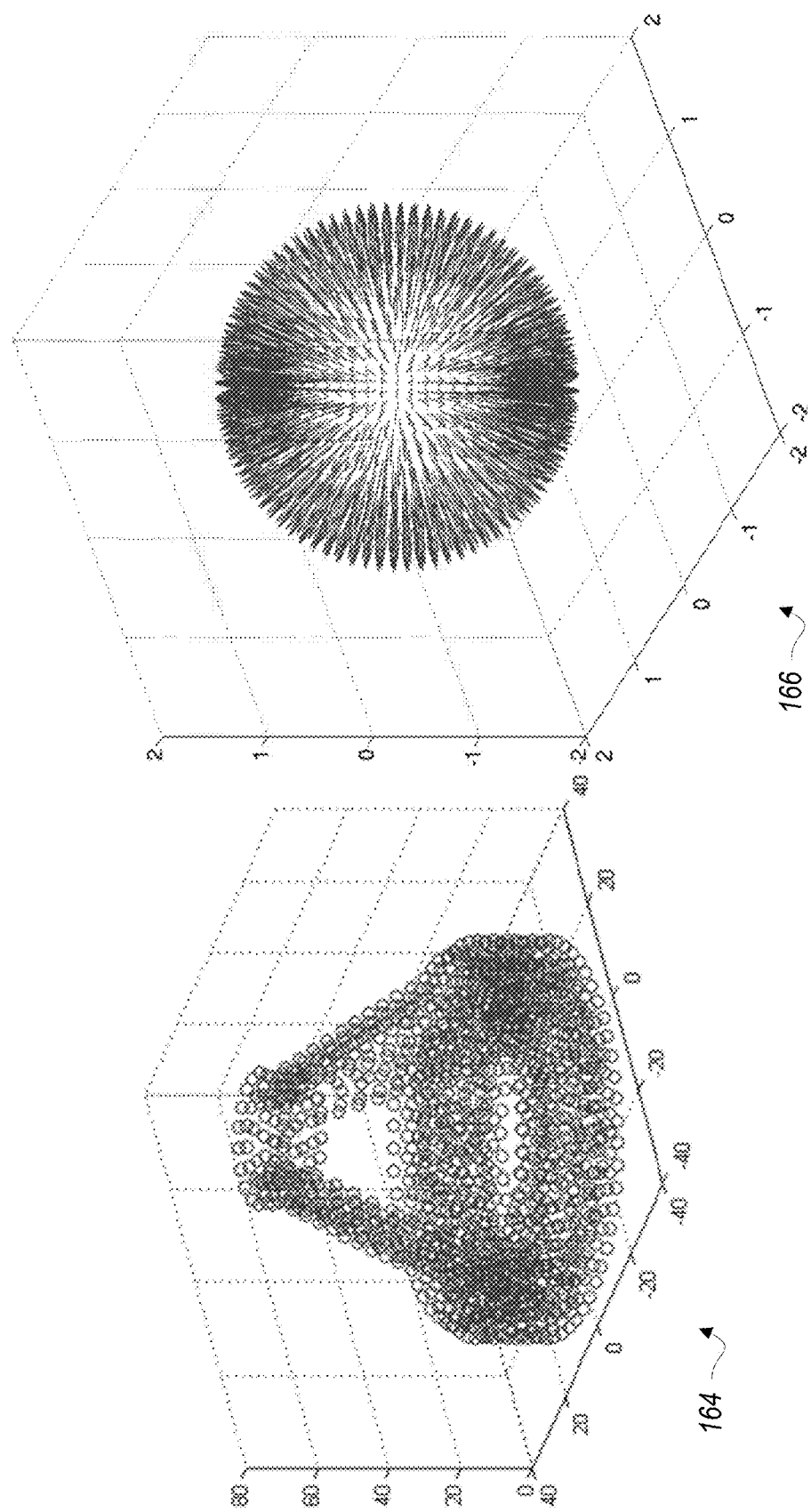
FIG. 1C is a perspective view illustrating possible point clouds for a cone and a sphere, similar to the shapes in FIGS. 1A and 1B.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Object recognition, as a part of machine vision, is an increasingly important aspect of computer technology. Many devices such as smartphones and tablets offer varying degrees of image recognition as an input to various applications. For example, a translation app may detect lettering in a foreign language, and provide an on-the-fly translation superimposed upon the foreign lettering. A shopping app may detect a given object or package within the camera view and use it to look up the object or package within an online store. More critically, autonomous vehicles can rely upon machine vision to detect various objects in a road environment, which are then used to help guide the vehicle safely.

Object detection and recognition can be performed on two-dimensional images, such as a still image or a video. The fact that 3-D objects will vary in appearance in a 2-D image depending upon the perspective of the camera capturing the image or video presents a challenge in performing object recognition on a 2-D image. The possibility of false positives increases as lighting and perspective makes objects appear increasingly similar in a 2-D image. For example, some objects may have a nearly identical appearance from a first perspective, but look different from a second perspective. Cues as to difference in shapes may be provided by different lighting or shading; however, distinguishing and recognizing two different objects may still be frustrated in certain lighting conditions and with certain perspectives. Such conditions can be avoided if depth data, such as a point cloud that may be captured for augmented reality (AR) purposes, can be incorporated into object recognition. With the availability of depth data for a given scene, perspectives and/or lighting conditions that result in objects being otherwise indistinguishable can be overcome by relying upon the depth data.

Disclosed embodiments are directed to performing object detection on a scene that is augments with depth data. Depth data is provided for a given captured scene by various techniques, e.g. photogrammetry, direct sensing, stereoscopic imaging, etc. By merging and correlating this depth data to the scene, objects that are visually ambiguous in a 2D frame, e.g. due to lighting and/or object perspective, can be distinguished and more accurately detected for subsequent processing.

FIG. 1A depicts a scene 100 of three 3-D objects: a cylinder 102, a cone 104, and a sphere 106. Scene 100 is taken from a slightly elevated side perspective and, as can be seen in FIG. 1A, this perspective allows the three objects to be readily distinguished. Performing object recognition on scene 100 would be expected to result in an accurate identification of each respective shape. The perspective is relatively insensitive; regardless of where a light source or sources are positioned, each of the three objects remains readily distinguishable from the others.

FIG. 1B depicts a scene 150, which includes the same objects as scene 100, except viewed from directly overhead perspective, looking down upon the objects. As can be seen, cylinder 102, cone 104, and sphere 106 each appear as substantially similar circles of roughly identical size, corresponding to cylinder 152, cone 154, and sphere 156. Lighting is essentially overhead, yielding fairly similar lighting effects on each object. As a result, it is practically impossible to ascertain the nature and overall shape of each object from a two-dimensional overhead view. In each case, object recognition would have difficulty distinguishing each of the three objects from each other, let alone providing an accurate determination of the nature of each different shape. A typical object recognition algorithm would detect each object as a circle.

FIG. 1C depicts a point cloud 164, representing points of depth data that may be captured for a cone, and a second point cloud 166 that may be captured for a sphere. Point clouds 164 and 166 approximate the point clouds that may be captured for cone 154 and truncated sphere 156. A point, as a person skilled in the art will appreciate, is a location on a surface of an object expressed in three dimensions, so as to convey depth information. As may be seen from FIG. 1C, an overhead view of the point cloud would yield different depth data between point cloud 164 and point cloud 166 at each point due to the different surface contours presented by a cone vs. a sphere. By integrating point cloud information as depicted in FIG. 1C, an object recognition routine configured to use depth data can distinguish between the sphere and the cone even if presented with an overhead visual view similar to FIG. 1B. It should be understood that although object recognition performance will vary depending on the actual camera perspective, with FIG. 1B representing a more problematic case for an object recognition routine, even easier cases may realize improved performance by the integration of depth data from a point cloud.

Figure 2:
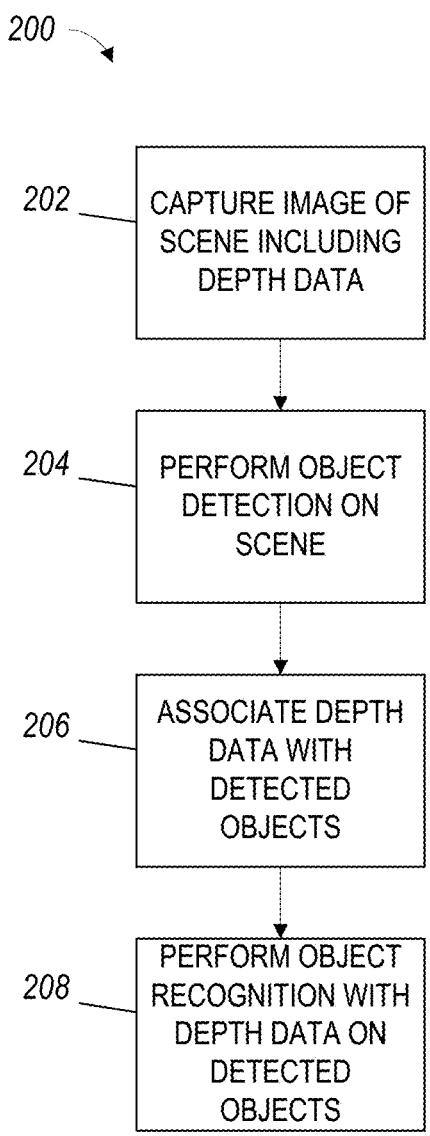
FIG. 2 is a flowchart of a method for performing object recognition using captured depth data, according to various embodiments.

FIG. 2 illustrates various operations, one or more of which may be carried out in whole or in part, in the execution of a method 200 for performing object recognition with the assistance of depth data, such as from a point cloud. Starting in operation 202, an image of a 3-D scene is captured, along with depth data for various points in the scene. The image may be a conventional photo, such as would be captured by a still camera or video camera. In various embodiments, depth data, such as a point cloud, is also obtained, potentially contemporaneously with the capture of the 3-D scene.

The depth data may be obtained by the same device capturing the image of the 3-D scene. For example, a smartphone may include a software layer configured to extract depth data from a scene through a number of different methods. One possible method includes using a plurality of images of the scene, each from a slightly different perspective, combined with photogrammetry techniques to compute depth data for a number of points that are shared in common between at least two of the plurality of images. Some smartphones and tablets may be able to use such techniques in real time, developing a point cloud as the device moves relative to the scene over time. Other devices may be equipped with at least two cameras, and so may be able to compute depth data from a single simultaneous capture from each camera. Other possible methods involve using different sensors, e.g. LIDAR or infrared depth sensing, to directly measure depth data across the 3-D scene. Still other methods may obtain depth data from an external source, possibly captured at a previous time or subsequent time, such as where an image is captured of a famous landmark that may have been depth-mapped in the past, or is later depth mapped post initial capture.

It will be understood that the capture of depth data may typically be scene-wide, and not specific to any given object within the scene. The resulting point cloud of depth data for the entire scene is passed for object recognition, discussed in more detail below.

In operation 204, the captured image of the scene may be passed through an object detector to locate and possibly map various objects in the scene. Object detection techniques now known or later developed in the art may be employed, e.g. edge detection, Hough transforms, etc. The result of operation 204 may be the location and type of various detected shapes, such as circles and polygons, and x,y coordinates in the image of each shape's location. Referring to FIG. 1B, an image of the scene of FIG. 1B may be detected to have three circles spaced horizontally across the image. Furthermore, in some embodiments lighting and color shading may also be analyzed to provide some possible information about the nature of the detected objects, e.g. solid, transparent, possible depth dimensions, etc.

In some embodiments, operation 204 may be omitted, with the depth data captured in operation 202 simply being correlated to the visual images of the captured scene. For example, the scene depth data may be captured or otherwise calculated on a frame-by-frame basis for a video stream, such as may be available by an augmented reality API available on many modern mobile devices. In such embodiments, each frame will include an associated point cloud for all detected depth points in the frame. The position of the points may be correlated to each video frame such that as the camera moves, the depth points effectively track with their corresponding features in the video stream from frame to frame. For still images, likewise, capture of depth data simultaneous with the still image may be automatically correlated, thus allowing operation 204 to be skipped. This simultaneous or automatic correlation may be considered at least partial performance of operation 206, discussed below.

The depth data captured in operation 202 is correlated or otherwise associated with the detected objects in operation 206. As discussed above, in some embodiments, operation 206 may be carried out by a capturing device contemporaneous or substantially contemporaneous with the capture of the corresponding video or still image. The coordinates of each detected object are correlated with the various depth data points, which may require a translation of coordinates of either the detected object or the depth data points if the frames of reference of the image and depth data vary.

In embodiments where the device capturing the image of the 3-D scene also determines depth data, e.g. a smartphone employing photogrammetry techniques, the device may be able to automatically correlate depth data to detected objects, as the device may record motion data while capturing the images used for photogrammetry. With the motion data, the device may have all the necessary information to map the reference frame for the coordinates of the depth data to the reference frame for the 3-D image used for object detection.

In other embodiments, such as where the depth data is obtained from an external source, additional reference frame information may be needed to reconcile the coordinates of the depth data to the coordinates of the objects detected from the image of the scene, particularly where the external depth data source was captured from a different perspective from the visual images or video. Such information may be available from various other sensors, such as GPS location data and/or magnetic compass data to orient the image of the 3-D scene with the orientation of the depth data. In still other embodiments, there may be unique features, e.g. landmarks, in the scene detectable by the object detector that can be readily identified within the depth data point cloud, and so serve as common points of reference by which the reference frames of the image and the depth data can be correlated.

Once the reference frames are correlated, in operation 206 the depth data is associated with the various detected objects. In various embodiments, this may include transforming the coordinates of various data points in one data source (the image or the point cloud) with corresponding coordinates in the other data source. For example, detected objects in the image of the 3-D scene may be expressed in x,y coordinates of pixels within the scene image. In contrast, points in the depth data point cloud may be expressed in x,y,z coordinates, with the z-axis indicating depth. The reference frame of the depth data point cloud can be equated to a particular perspective, e.g. camera angle, of the device capturing the point data, such as the angle of view of the point clouds 164, 166 depicted in FIG. 1C. By knowing the reference frame of the point data, the x,y coordinates of each point can be converted to corresponding x,y coordinates for the image of the scene. Along with any necessary scaling of the z-axis depth data, each point of depth data can thus be mapped (aka projected) to an x,y pixel location of the image of the 3-D scene. Considered another way, the 3-D point cloud is transformed or projected upon the 2-D scene by essentially rotating and scaling the data to line up with the reference frame of the scene image. This provides a mapping of depth data for various objects captured in the image scene.

Once the depth data is mapped to the various detected objects, the image and depth data can be passed through an object recognition routine in operation 208. The addition of the depth data can be used in object recognition in conjunction with a model library to determine which objects are present in the scene image. Referring back to FIGS. 1B and 1C, it will be understood that the depth data of the cone 154 and sphere 156, represented by point clouds 164 and 166, respectively, will enable an object recognition routine to correctly recognize the cone and sphere shapes, as the depth data will differ for each respective shape in an overhead view, even where each shape otherwise appears visually identical when viewed overhead.

With respect to the entirety of a captured scene, detected shapes and objects can be correlated with the depth data points overlapping the frame regions of the detected shapes and objects. With this additional depth data, roughly similar shapes and objects, from the perspective of the object recognition algorithm, can be distinguished and more accurately identified.

In some embodiments, a model library may be used to assist in carrying out operation 208. The model library may contain information about various types of objects, including model depth data that provides the relative position of various points on a given 3-D object. This relative position data may allow the object recognition routine to more accurately identify a given object. For example, in some embodiments the model may be used to calculate depth ratios relative to various surrounding depth points. These ratios may then be scaled, and used to compare ratios of depth points for the image or video being analyzed; a positive identification may be made where the compared ratios are sufficiently similar.

Figure 3:
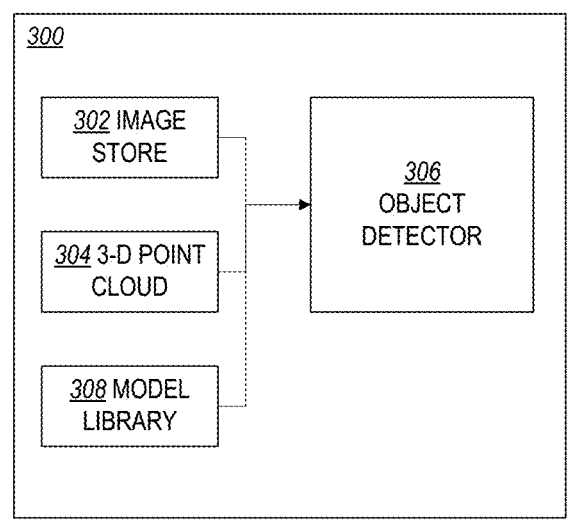
FIG. 3 is a block diagram of an example apparatus that may be configured to carry out the method of FIG. 2, according to various embodiments.

Turning to FIG. 3, a block diagram of a possible system or apparatus to carry out method 200 is depicted. In various embodiments, apparatus 300 includes an object detector 306, which may be fed from one or more data sources including an image store 302, a 3-D point cloud 304, and a 3-D model library 308. In some embodiments, one or more of these various data sources may be combined, e.g. image store 302 may be integrated into 3-D point cloud 304, with correlation of data per operation 206 having been accomplished prior to providing the data to object detector 306, or in-capture device when captured by a suitably configured device, as discussed above.

In other embodiments, this correlation and operation 206 may be carried out by object detector 306 using separate image store 302 and 3-D point cloud 304. Each of the image store 302, 3-D point cloud 304, and model library 308 may be stored in any suitable fashion, e.g. database, flat file, collections of files, using metadata, etc., and in any suitable data types and/or structures. For example, image store 302 may store images in any known image format, such as JPEG, PNG, GIF, TIFF, BMP, or another suitable image format. Likewise, the 3-D point cloud 304 may comprise a list of coordinate data, or may be stored in a 2-D or 3-D array, or any other suitable data structure. Model library 308 may also store model information in any suitable format, such as a STP file.

In embodiments, object detector 306 may handle both object detection in operation 204 as well as object recognition in operation 208, and may perform transformation and correlation of the various data sources 302, 304, and 308, to generate any suitable data structures usable with object recognition.

Apparatus 300 may be implemented in whole or in part in software, such as on a computer-readable medium, in hardware using dedicated logic components, such as a field-programmable gate array or application-specific integrated circuit, or a combination of both. Object detector 306 may be configured to carry out operations 204, 206, and 208 of method 200.

Figure 4:
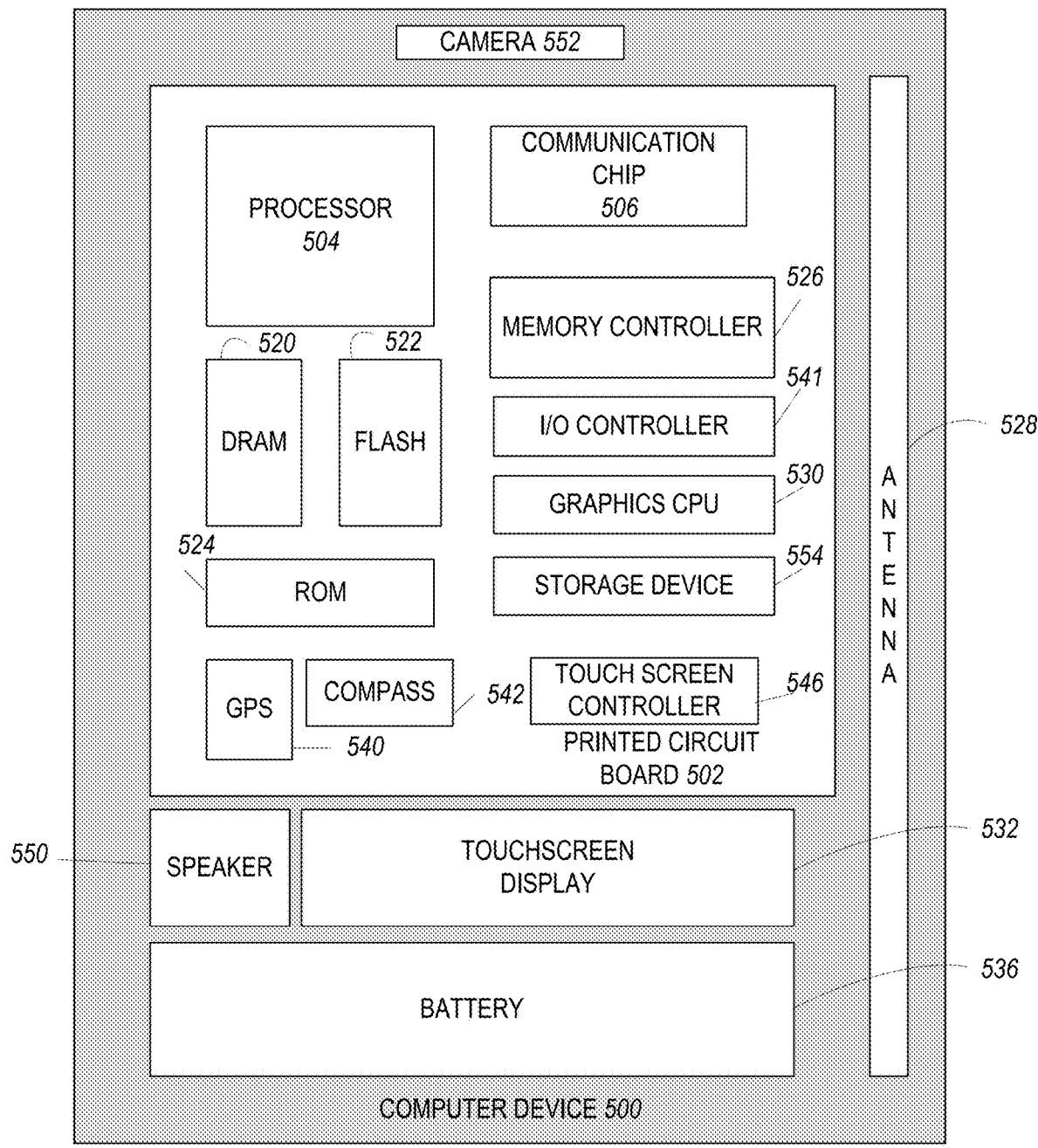
FIG. 4 is a block diagram of an example computer that can be used to implement some or all of the components of the system of FIG. 1, according to various embodiments.

FIG. 4 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 300 and method 200 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 5:
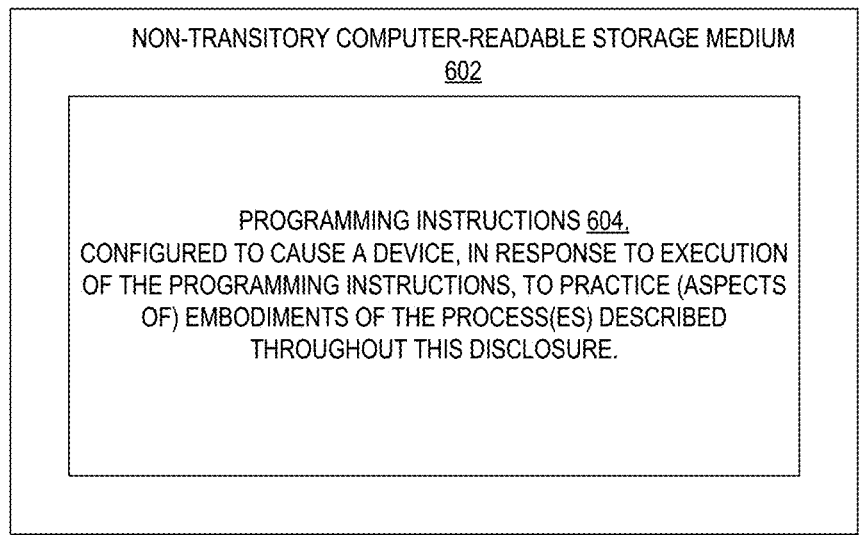
FIG. 5 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 300 and method 200. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method, comprising:
capturing, using a camera, a video of a scene;
detecting, within a reference frame from the video of the scene, a location of one or more objects;
obtaining depth data of the scene by capturing the depth data contemporaneously with capturing the video of the scene; obtaining motion and location data of the camera; correlating, using the motion and location data, positions of points of the depth data to the reference frame; correlating, using at least the correlated positions of the depth data points, the depth data with the one or more detected objects; and performing object recognition on the one or more detected objects using the depth data.

2. The method of claim 1, wherein obtaining the depth data of the scene comprises capturing the depth data at a different time from capturing the scene video.

3. The method of claim 1, wherein performing object recognition further comprises performing object recognition on the scene using a model library of 3-D objects.

4. The method of claim 1, further comprising performing edge detection upon the scene, and correlating one or more depth points in the depth data with one or more detected edges.

5. A non-transitory computer-readable medium (CRM) comprising instructions that, when executed, cause the CRM to:
capture, using a camera, a video of a scene;
detect, within a reference frame from the video of the scene, a location of one or more objects;
obtaining depth data of the scene by capturing the depth data contemporaneously with capturing the video of the scene; obtain motion and location data of the camera; correlate, using the motion and location data, positions of points of the depth data to the reference frame from the scene video; correlate, using at least the correlated positions of the depth data points, the depth data with the one or more detected objects; and perform object recognition on the one or more detected objects with the depth data.

6. The CRM of claim 5, wherein the instructions are to further cause the apparatus to perform edge detection upon the scene, and correlate one or more depth points in the depth data with one or more detected edges.

7. The CRM of claim 5, wherein the instructions are to further cause the apparatus to capture the depth data of the scene.

8. The CRM of claim 5, wherein the instructions are to further cause the apparatus to perform object recognition on the scene using a model library of 3-D objects.

9. An apparatus, comprising: an image store;
and an object detector, wherein: the image store is to receive a video of a scene captured by a camera, detecting, within a reference frame from the video of the scene, a location of one or more objects;

obtaining depth data of the scene by capturing the depth data contemporaneously with capturing the video of the scene; obtaining motion and location data of the camera, and a 3-D point cloud, the object detector is to detect one or more objects within the reference frame from the video, the object detector is to correlate, using the motion and location data, the 3-D point cloud to the one or more objects detected within the reference frame, and the object detector is to recognize the one or more objects based at least the 3-D point cloud and the depth data.

10. The apparatus of claim 9, wherein the image store is to receive the video and 3-D point cloud from a mobile device.

11. The apparatus of claim 10, wherein the 3-D point cloud is captured contemporaneously with the video.

12. The apparatus of claim 9, wherein the object detector is to further detect objects within the video based at least in part upon a model library of 3-D objects.

13. The apparatus of claim 9, wherein the apparatus is a mobile device.

\* \* \* \* \*